Dec. 26, 1950 J. Q. BUCKLES ET AL 2,535,896

PATTERN CONTROLLED MILLING MACHINE

Filed Feb. 28, 1946 6 Sheets-Sheet 1

INVENTORS
JOHN Q. BUCKLES
GEORGE A. LENSKY
WINTHROP TRIBLE
BY Harold K. Parsons + Leigh W. Wright.
ATTORNEYS Dec. 26, 1950 J. Q. BUCKLES ET AL 2,535,896

PATTERN CONTROLLED MILLING MACHINE

Filed Feb. 28, 1946 6 Sheets-Sheet 2

INVENTORS
JOHN Q. BUCKLES
GEORGE A. LENSKY
WINTHROP TRIBLE
BY
Harold K. Parsons & Leigh W. Wright
ATTORNEYS

PATTERN CONTROLLED MILLING MACHINE

Filed Feb. 28, 1946 6 Sheets-Sheet 3

INVENTORS
JOHN Q. BUCKLES
GEORGE A. LENSKY
WINTHROP TRIBLE
BY
Harold K. Parsons + Leigh W. Wright
ATTORNEYS

PATTERN CONTROLLED MILLING MACHINE

Filed Feb. 28, 1946 6 Sheets-Sheet 4

INVENTORS
JOHN Q. BUCKLES
GEORGE A. LENSKY
WINTHROP TRIBLE
BY Harold W. Parsons & Leigh W. Wright.
ATTORNEYS

PATTERN CONTROLLED MILLING MACHINE

INVENTORS
John Q. Buckles
George A. Lensky
Winthrop Trible.
BY H. K. Parsons + L. W. Wright.
ATTORNEYS Dec. 26, 1950 J. Q. BUCKLES ET AL 2,535,896

PATTERN CONTROLLED MILLING MACHINE

Filed Feb. 28, 1946 6 Sheets-Sheet 6

INVENTORS
JOHN Q. BUCKLES
GEORGE A. LENSKY
WINTHROP TRIBLE
BY Harold K. Parsons & Leigh W. Wright.
ATTORNEYS Patented Dec. 26, 1950 2,535,896

UNITED STATES PATENT OFFICE 2,535,896

PATTERN CONTROLLED MILLING MACHINE

John Q. Buckles, George A. Lensky, and Winthrop Trible, Cincinnati, Ohio, assignors to The Cincinnati Milling Machine Co., Cincinnati, Ohio, a corporation of Ohio Application February 28, 1946, Serial No. 650,806

18 Claims. (Cl. 90—13.4)

This invention relates to machine tools and more particularly to automatic pattern controlled milling machines.

One of the objects of this invention is to provide an improved machine for automatically progressively producing profile surfaces on the periphery of a rotatable workpiece from a pattern or master.

Another object of this invention is to provide an improved automatic pattern controlled milling machine for machining simultaneously a series of non-contiguous profile surfaces on a plurality of continuously revolving work pieces in one continuous automatic cycle.

Still another object is to provide an improved combined electric and hydraulic operating and control circuit for a rotary profile milling machine.

A further object of this invention is to provide a machine in which the cutter may be moved into engagement with a random point on the surface of a continuously rotating work piece but in which a predetermined angle of rotation of the work from said random point will be subsequently effected, followed by separation between the cutter and work whereby the cutter may be rendered effective on the work for a full revolution, or more or less than a full revolution thereof regardless of the starting point of the cutter.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 10A:
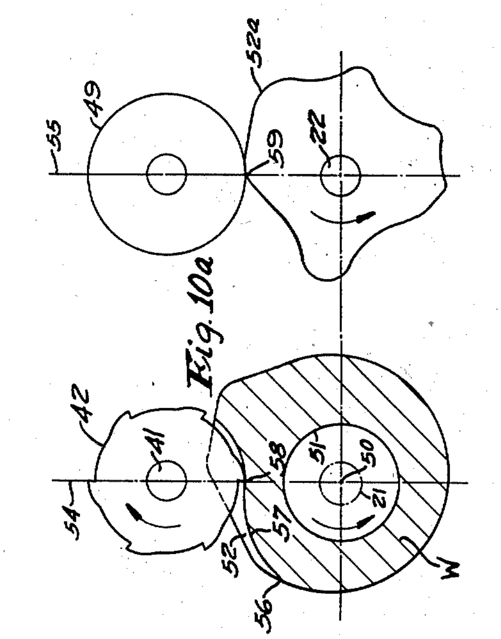
Figure 10 is an enlarged diagrammatic view indicated by the line 10—10 in Figure 1 showing the relationship of the cutter, work, tracer, and pattern at the beginning of a cutting cycle on one of the peripheral profile surfaces on the work.
Figure 10C:
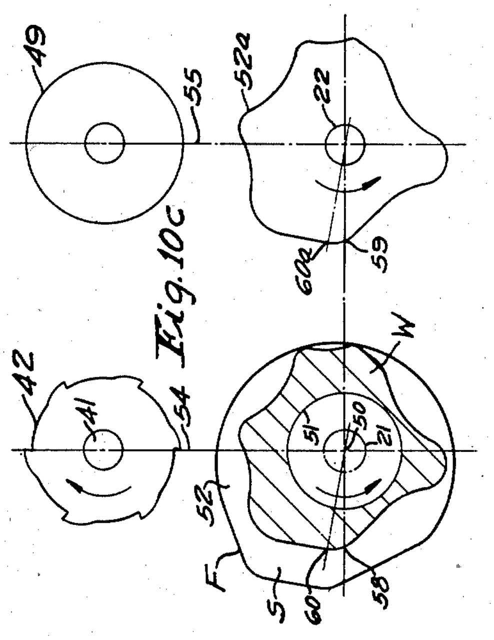
Figure 10:
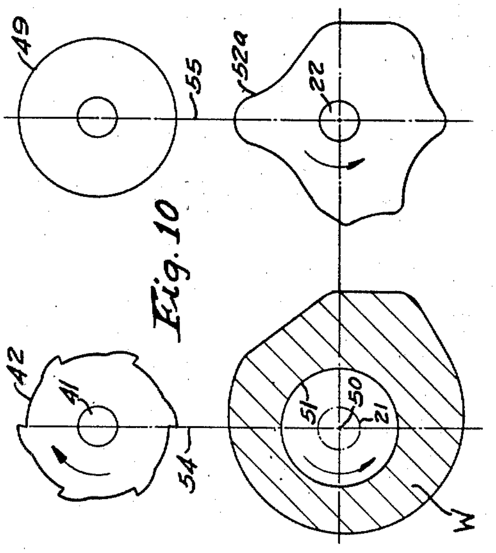

Figure 10*a* is a diagrammatic view similar to Figure 10 showing the relationship of the cutter, work, tracer, and pattern at the time of initial engagement of the tracer with the pattern.

Figure 10B:
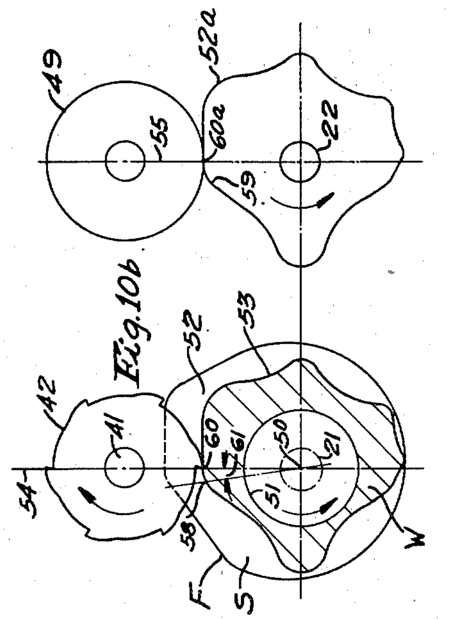

Figure 10*b* is a diagrammatic view similar to Figure 10 showing the relationship of the cutter, work, tracer, and pattern at the completion of cutting the profile surface on the work.

Figure 10*c* is a diagrammatic view similar to Figure 10 showing the relationship of the cutter, work, tracer, and pattern retracted to position for movement into position to machine a different profile surface on the work.

Figure 1:
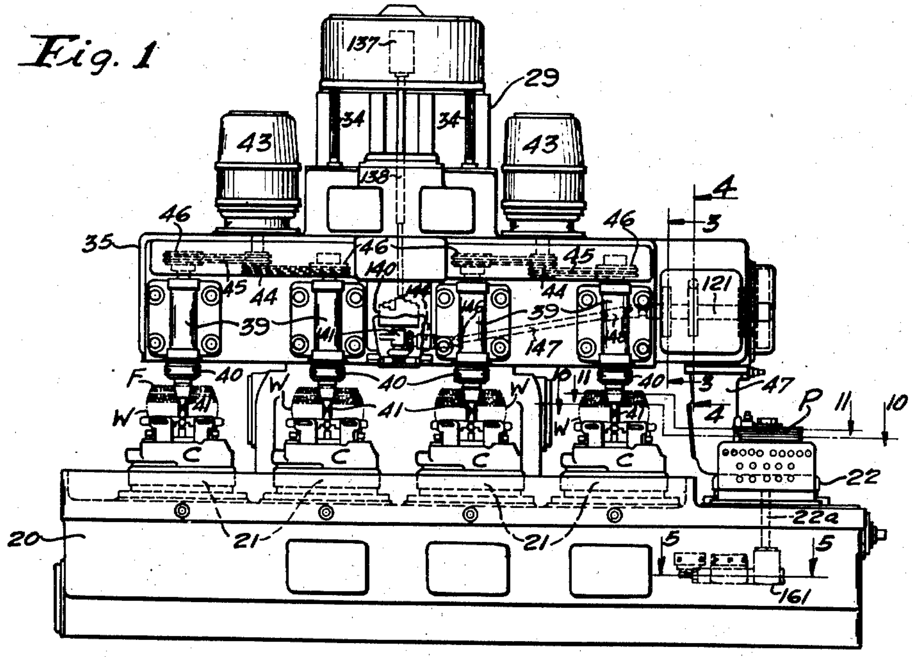
Figure 1 is a front elevational view of a multiple spindle pattern controlled milling machine incorporating the features of this invention.
Figure 11A:
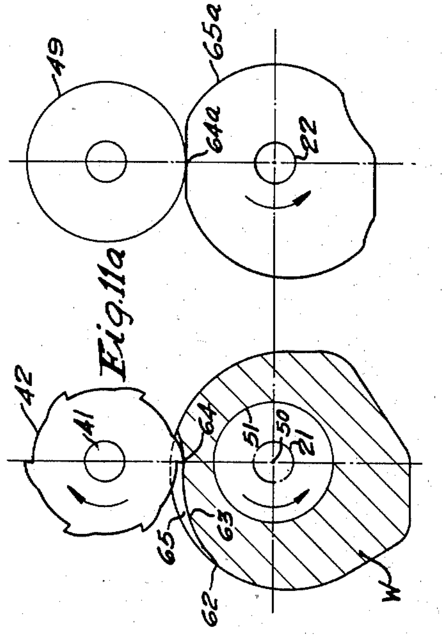
Figure 11C:
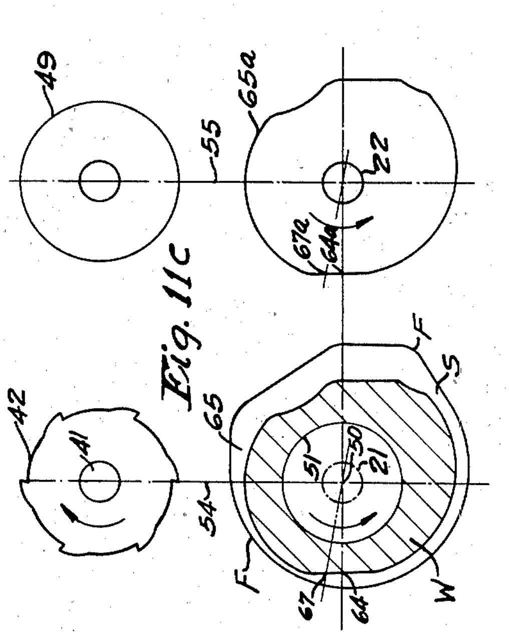
Figure 11:
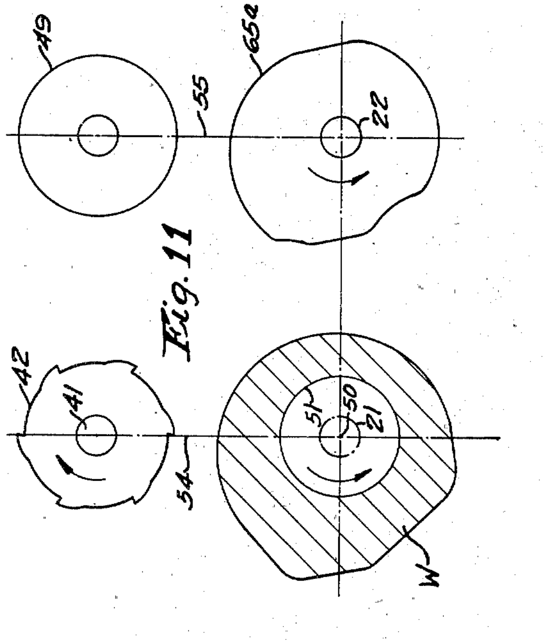

Figure 11 is a diagrammatic view similar to Figure 10 indicated by the line 11—11 in Figure 1 showing the relationship of the cutter, work, tracer, and pattern at the beginning of a cutting cycle on a different peripheral profile surface on the work.

Figure 11*a* is a diagrammatic view similar to Figure 11 showing the relationship of the cutter, work, tracer, and pattern at the time of initial engagement of the tracer with the pattern.

Figure 11B:
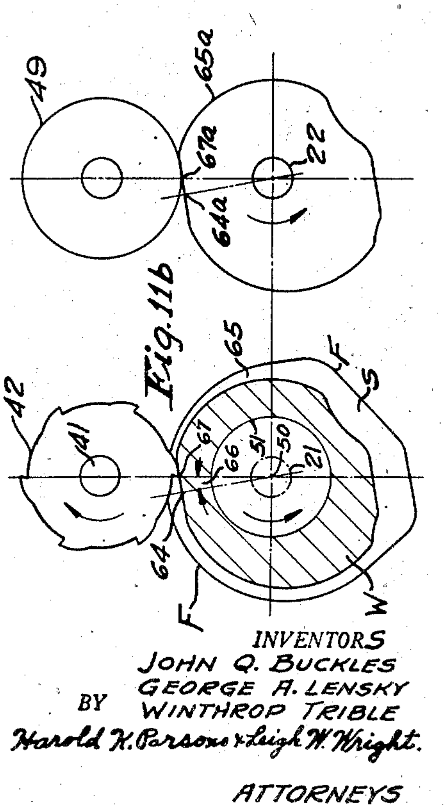

Figure 11*b* is a diagrammatic view similar to Figure 11 showing the relationship of the cutter, work, tracer, and pattern at the completion of cutting the profile surface on the work.

Figure 11*c* is a diagrammatic view similar to Figure 11 showing the relationship of the cutter, work, tracer, and pattern retracted to position for movement into position to machine still another profile surface on the work.

Figure 12:
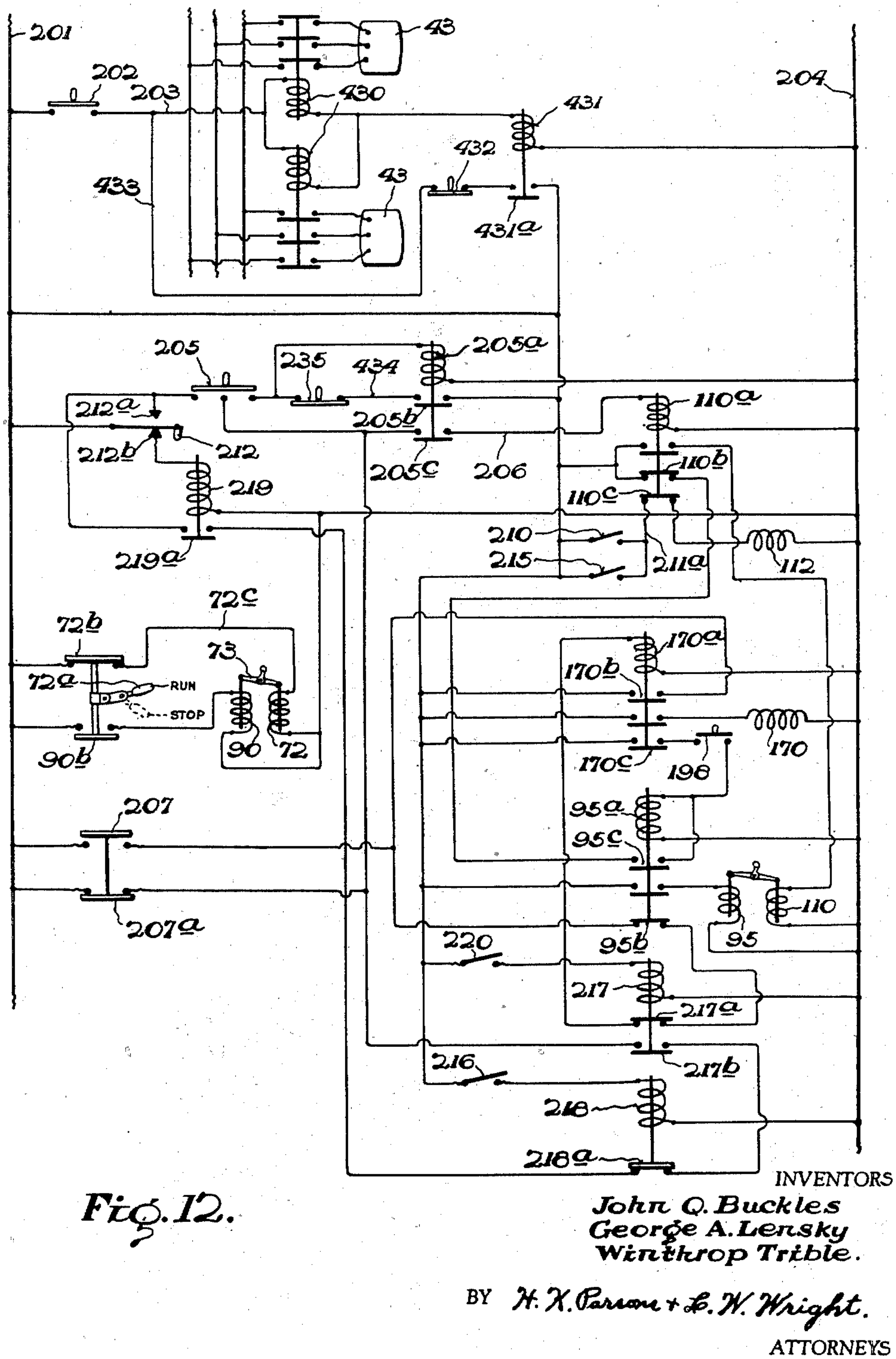

Figure 12 is an elementary wiring diagram of the electric control circuit of the machine.

Figure 13:
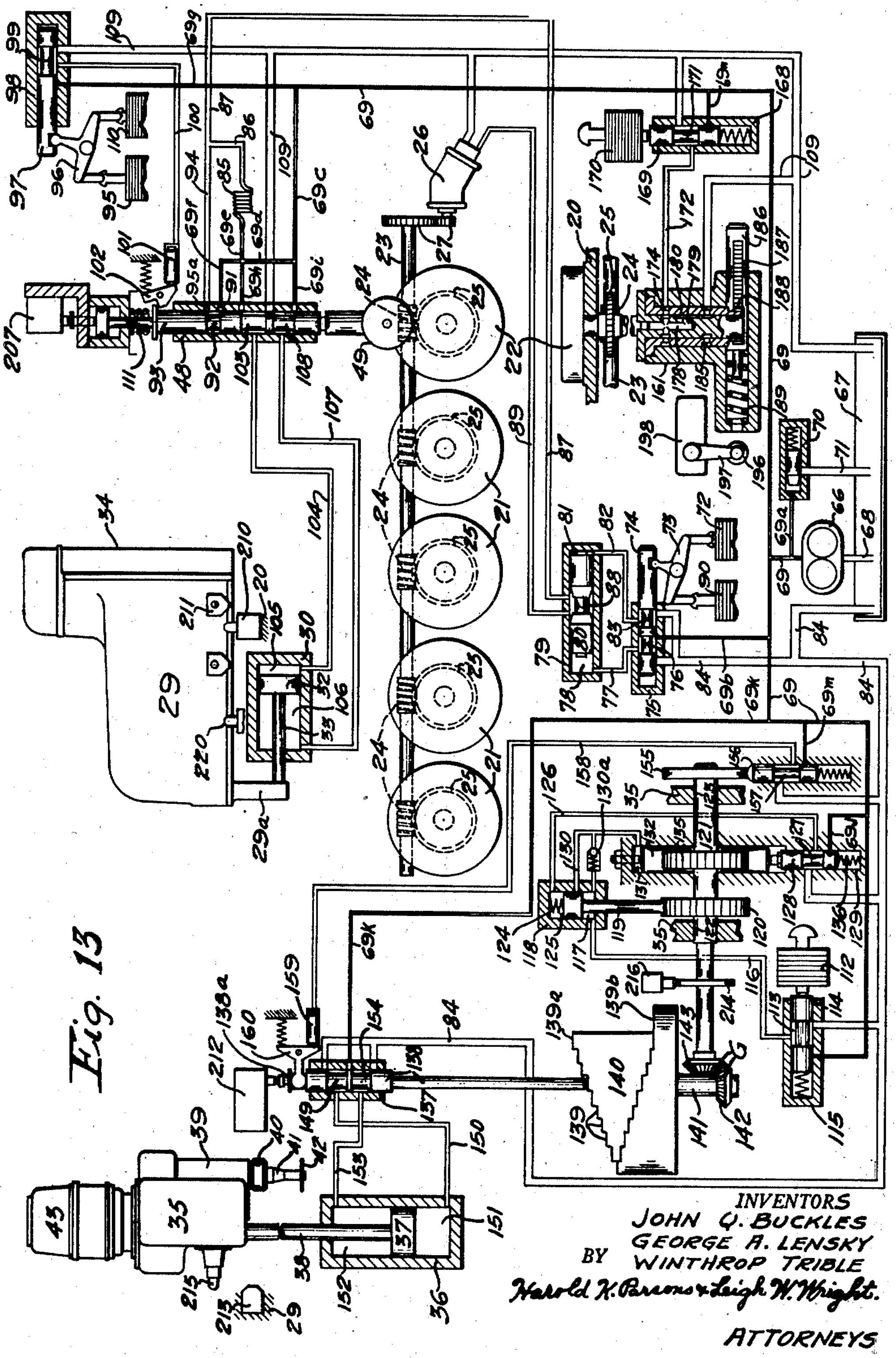

Figure 13 is a diagram of the hydraulic operating circuit for the machine.

As an example of a machine adapted to carry out the concepts of this invention, there is illustrated a multiple spindle pattern controlled milling machine for machining slots in airplane cylinder heads to form the heat radiating fins thereon.

*Work spindle drive*

Such a machine comprises a base 20 upon which are appropriately journaled a series of rotary work supports 21 and a pattern support 22. All of these supports are rotated synchonously through a common drive shaft 23, Figure 13, upon which is fixed a series of worms 24 which operatively engage identical worm wheels 25 fixed to the supports 21 and 22. The shaft 23 is driven by the hydraulic feed motor 26 through suitable gearing 27 so that when this motor is actuated the supports are simultaneously and continuously rotated in accordance with the operation of the motor.

*Cross slide*

On the rearwardly extending portion of the base 20 is formed guideways 28 upon which is slidably mounted cross slide 29 for movement to and from the work supports 21 and pattern support 22. This cross slide 29 is actuated in cross feeding movement in either direction by means of a hydraulic actuator or cylinder 30, Figure 2, which is rigidly fixed to the surface 31 of the base 20 and has operating therein a piston 32 to which is attached the piston rod 33 connected to an integral lug 29*a* formed on the cross slide 29 so that by the application of fluid pressure in the cylinder 30 its piston 32 and thereby the cross slide 29 may be reciprocated.

*Spindle carrier*

On appropriate vertically disposed guideways 34 formed on the front face of the cross slide 29 is mounted for vertical movement the spindle carrier 35 which may be reciprocated vertically by means of a hydraulic cylinder 36, Figure 13, suitably fixed to the cross slide housing 29 and having a piston 37 and an associated piston rod 38 suitably attached to the spindle carrier 35 so that upon appropriate application of fluid pressure in the cylinder 36 the spindle carrier may be raised or lowered on the guideways 34.

The spindle carrier 35 comprises a horizontally elongated housing upon which is fixed a series of tool or cutter spindle brackets 39 in which are journaled the cutter spindles 40. Each of these cutter spindles carries a cutter arbor 41 upon which is mounted the milling cutters 42. Each pair of cutter spindles is driven by one of the cutter motors 43 connected through their respective pulleys 44 and belts 45 to pulleys 46 carried by the cutter spindles 40 so that the cutter spindles and cutters may be rotated at cutting speed for any vertical position of the spindle carrier.

Also mounted on the spindle carrier 35 is the tracer support bracket 47 carrying the tracer valve 48 having a pattern contacting tracer disc 49 which is the same diameter as the cutters 42 being utilized to machine the work. This tracer disc is arranged to engage the pattern array P mounted rigidly on the pattern support 22, Figure 1.

*General operating cycle*

In this particular exemplary disclosure the workpiece comprises an airplane cylinder head W having a main cylindrical portion upon which the heat radiating fins F are formed by milling away the metal to form the slots S, Figures 10*b*, 10*c*, 11*b*, and 11*c*, in planes perpendicular to the axis 50 of the work support and the cylinder barrel cavity 51 of the cylinder head. Suitable clamping fixtures or chucks C serve to locate and hold the work W on the work supports 21 in proper relationship with the cutters 42 and the pattern array P.

The slots to be cut are spaced axially of the work and may vary greatly as to depth and configuration. For instance, in this specific workpiece the metal to be cut away to form one of the slots is indicated in Figures 10*b* and 10*c* by the uncross-hatched portion 52. The depth and configuration of the bottom 53 of the slot 52 is determined by its related template 52*a* of the pattern array P. This template cooperates with the tracer disc of the tracer control valve 48 as the template and work continuously rotate during the cutting operation to control the relative radial movement of tracer and cutter with respect to the pattern array P and work W.

In Figure 10 is shown the relative position of the cutter and tracer with respect to the work and pattern at the beginning of a cutting cycle with the cutter and tracer in fully retracted position. To begin the machining operation the work and pattern are started and continuously rotated at all times during the machining of the slots in the work pieces. With the work and pattern thus rotating continuously the cutter and tracer are respectively fed radially of the work and pattern along the lines 54 and 55 so that the cutter initially engages the workpiece at some random point 56, Figure 10*a*. It is therefore obvious that initial contact of the cutter and workpiece may occur at any random point on the periphery of the work.

As the work slowly rotates and the cutters continue to feed radially toward the work an involute path 57 is initially cut into the workpiece until the cutter reaches full depth of the desired slot at a point 58 as determined by engagement of the tracer disc 49 with the pattern 52*a* at a point 59 to thereby establish tracer control movement of the cutters radially of the work pieces. At this point the workpieces are preferably rotated at a more rapid feed rate to cause the cutter to relatively travel around the periphery of the work to machine the slot 52, as shown in Figure 10*b*, the cutter ultimately arriving at the point 60 on the work and the tracer disc at the point 60*a* on the pattern 52*a*. It is desirable that the work supports and pattern rotate through slightly more than 360 degrees regardless of the starting point, as indicated by the angle 61 in order to provide a sufficient overlap of the cut from initial starting position to completely machine the slot 52 without leaving an undesirable flash or unmachined portion in the slot. When the point 60 is reached the cutter and tracer are rapidly withdrawn radially along the lines 54 and 55, Figure 10*c*, while the work and pattern continue to rotate at a predetermined slow speed.

When the cutter and tracer have arrived at the withdrawn position shown in Figure 10*c* the cutter and tracer are then indexed upwardly into position to cut another slot as, for example, a slot of the character shown in Figure 11. The work and pattern continue to rotate at all times so that as the cutter and tracer again move radially inwardly along the lines 54 and 55, Figure 11, the cutter will begin to engage the work at some random point 62, Figure 11*a*, and will cut a spiral inwardly extending slot 63 in the work until the cutter arrives at the point 64 at which time the tracer disc 49 engages the corresponding pattern 65*a* at a point 64*a* to stop the feed and subsequently control the proper form for the slot 65 to be machined in the work. Tracer control is thus established and the work continues to rotate through a complete revolution of 360 degrees plus a small additional amount indicated by the angle 66, Figure 11*b*, until the cutter arrives at the point 67. The cutter and tracer are then automatically retracted along the lines 54 and 55 as indicated in Figure 11*c* to a withdrawn position where the cutter and tracer may again be moved or indexed into position to cut still other slots. After the last slot is cut the cutter and tracer are returned downwardly to initial starting position preparatory to cutting a group of slots on a new set of workpieces.

It is to be noted that the configuration of each individual slot may be quite irregular as shown in Figure 10*b* and that there is considerable variation from one slot to another as indicated by a comparison of Figures 10*b* and 11*b*. In order to maintain the highest degree of cutting efficiency, it is necessary to vary the rate of rotation or feed movement of the work spindles in accordance with rapid changes in profile. As a result the time required for the work to rotate a complete revolution and a small amount in excess thereof is subject to considerable difference from one slot to the next. In order to accurately determine the point of withdrawal of the cutter from the work, as in Figures 10*b* and 11*b*, without requiring the work to rotate an excessive amount beyond that necessary to just complete a slot, a mechanical angular rotation measuring device directly responsive to the amount of rotation of the work and independent of the time required for such rotation is provided.

*Hydraulic operating system*

The work spindles, cross slide, and spindle carrier are operated in their various movements to carry out the above-described machining cycle by hydraulic pressure actuating mechanism. Referring particularly to Figure 13, fluid pressure for operating the machine is derived from a pump 66 which receives a supply of fluid from a hydraulic reservoir 67 through a suction line 68. This fluid is delivered under pressure into the line 69 having a branch line 69*a* connected to a suitable relief valve 70 which, in turn, is connected by a drain line 71 to the reservoir 67, the relief valve serving to maintain the desired operating pressure in the line 69 and its associated branch lines.

The work supports 21 and pattern support 22 are started in rotary motion by energizing solenoid 72 which is connected through suitable linkage 73 to the plunger 74 of the stop and start pilot control valve 75 so as to connect pressure from the line 69 and the line 69*b* through the annular groove 76 of the plunger 74 to a line 77 connected to chamber 78 in the stop and start valve 79 so as to move its plunger 80 to the position shown in Figure 13. Fluid is exhausted at this time from chamber 81 through line 82 and the annular groove 83 in the valve plunger 74 to the drain line 84 for return to the reservoir 67. When the plunger 80 of the valve 79 is so positioned, fluid pressure from the line 69 and the branch lines 69*c* and 69*d* is connected through line 69*e* to a fluid resistance 85 which allows a certain predetermined amount of fluid to enter the line 86 and the line 87 connected to the valve 79 and pass through the annular groove 88 of the valve plunger 80 into the line 89 connected to the intake of the hydraulic driving motor 26 for establishing a basic rate of continuous rotation of the work and pattern supports.

When it is desired to stop rotation of the work and pattern supports, the solenoid 90 is energized which is also connected by suitable linkage 73 for shifting the valve plunger 74 so that fluid pressure will be connected from the line 69*b* through the annular groove 83 and the line 82 to the chamber 81 of the valve 79 to thus shift its plunger 80, to the left, Figure 13, so as to block off the supply of fluid from the line 87 from actuating the hydraulic motor 26. Fluid is discharged at this time from the pressure chamber 78 through the line 77 and the annular groove 76 to the drain line 84 for return to reservoir 67.

Whenever the tracer is in an extreme overdeflected or undeflected position the only fluid pressure supply for actuating the motor 26 is that passing through the resistance 85. When the tracer is in normal tracing position the fluid supply through the resistance 85 is supplemented by an additional supply from the line 69*d* and the line 69*f* which is connected to a port 91 in the tracer valve 48. This port cooperates with an annular groove 92 formed in the tracer valve plunger 93. The line 87 is connected by means of a line 94 to the port 95*a* provided in the tracer valve 48, port 95*a* also cooperating with the annular groove 92 in the tracer valve plunger 93. The annular groove 92 is so arranged with relation to the ports 91 and 95*a* that when the tracer valve plunger 93 is in normal tracing position with the tracer disc 49 in contact with the pattern, the supply of fluid pressure may pass from line 69*f* to line 94 and then to the hydraulic motor 26 as described to rotate the work and pattern supports at a normal rapid cutting feed rate.

Whenever the tracer is deflected a marked amount from normal tracing position, as when the tracer is passing over an obstruction or into a cavity causing relatively rapid radial movement of the cutter with respect to the work, the ports 91 and 95*a* will be controlled so as to restrict the flow between lines 69*f* and 94 and thereby slow up the speed of rotation. In this way the rate of feed rotation of the work and pattern supports is automatically varied in accordance with the rapidity of changes in the profile of the pattern.

The tracer plunger 93 may be purposely overdeflected in order to cause the cross slide to move back away from the work and to stay in retracted position by energizing solenoid 95 which is connected through suitable linkage 96 for moving the plunger 97 of the cross slide control valve 98 to connect pressure from the line 69*g* through the annular groove 99 of the valve plunger 97 to the line 100 connected to a pressure plunger 101 which, through a suitable lever 102, actuates the tracer plunger to overdeflected position. When in overdeflected position the tracer valve connects fluid pressure from the line 69*h* through the annular groove 103 and the line 104 to the chamber 105 of the cross slide actuating cylinder 30, while fluid is discharged out of the chamber 106 of the cylinder 30 through the line 107 and the annular groove 108 in the tracer valve plunger 93 to the drain line 109 for return to the reservoir 67.

When the tracer is released and moved to undeflected position by the spring 111, pressure from the line 69*i* will be connected through the annular groove 108 to the line 107, then to the chamber 106 in the cross slide cylinder 30 to cause forward movement of the cross slide 29, while fluid is discharged from the other chamber 105 of the cylinder 30 through the line 104 and annular groove 103 of the tracer valve into the drain line 109. When the solenoid 110 is energized, the valve plunger 97 is positioned as shown in Figure 13 so as to relieve pressure from behind the plunger 101 by connecting the line 100 through the annular groove 99 of the plunger 97 to the drain line 109, thus releasing the tracer plunger 93 to undeflected position. When the plunger 93 is operating in normal tracing position, the annular grooves 103 and 108 formed in the plunger cooperate with the pressure lines 69h and 69i and the drain line 109 to reversibly apply fluid pressure to the cross slide operating cylinder 30 to actuate the cross slide 29 in tracer controlled movement in response to the configuration of the pattern.

Vertical indexing movement of the spindle carrier 35 for successively moving cutters and tracer into position to machine each slot on the workpiece is obtained by energizing the solenoid 112 which connects fluid pressure from the line 69 through the annular groove 113 of the plunger 114 of the indexing control valve 115 to the line 116. The line 116 is connected to the chamber 117 of the detent plunger cylinder 118, Figure 13, to cause withdrawal of the detent plunger 119 from the detent wheel 120 fixed on the shaft 121 of the index control assembly journaled in suitable bearings 122 and 123 of the spindle carrier 35. The detent plunger is thus withdrawn against a compression spring 124 in the chamber 125 of cylinder 118, fluid being discharged from this chamber through a line 126, annular groove 127 of the valve plunger 128 where it enters the drain line 84 for return to reservoir 67.

Figure 4:
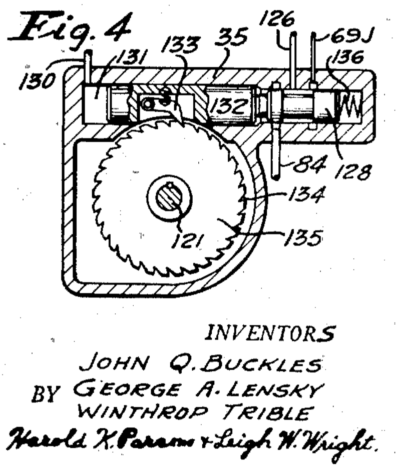
Figure 4 is a vertical sectional view on the line 4—4 of Figure 1.

As the detent plunger 119 becomes fully withdrawn it connects pressure from the line 116 to the pressure chamber 131 to effect operation of the ratchet plunger 132. This plunger has a pawl 133, Figure 4, adapted to successively engage the various indexing notches 134 in the ratchet wheel 135 fixed on the shaft 121. As pressure builds up in the chamber 131 the ratchet plunger 132 causes the pawl 133 to rotate the disc 135 and the shaft 121 one indexed position. As the plunger 132 reaches its forward position, it shifts a control valve plunger 128, Figure 13, so that fluid pressure is connected from the line 69j to the line 126 and thereby to the pressure chamber 124 to move the detent plunger 119 back into engagement with the detent disc 120.

As soon as the indexing has been completed the solenoid 112 is deenergized to disconnect line 69 from the line 116 while connecting line 116 through the annular groove 113 to the drain line 84. Thus, the chamber 117 in cylinder 118 is connected to drain line 84 so that the plunger 119 is free to move into engagement with the detent disc 120. At the same time the compression spring 136 behind the plunger 128 automatically returns the ratchet plunger 132 whereby pawl 133 drops into the next successive notch 134 of the ratchet disc 135. Fluid is discharged from the pressure chamber 131 behind the ratchet plunger 132 out through the line 130 and check valve 130a to the chamber 117 in the line 116 through the annular groove 113 of the valve 115 to the drain line 84. Thus, whenever the solenoid 112 is energized, the shaft 121 of the indexing mechanism is indexed one notch, and when the solenoid 112 is deenergized the apparatus is then reset for the next indexing operation.

The indexing movement of piston 37 is controlled by means of a servo-valve 137 rigidly mounted on the cross slide 29. This valve has an axially movable plunger 138 adapted to engage the steps 139 formed on the indexible drum 140 journaled in a suitable bearing 141 mounted on the spindle carrier 35. This drum is adapted to be driven through a suitable gearing indicated at G which may comprise a bevel gear 142 fixed to rotate with the drum 140 and driven by a second bevel gear 143 on a suitable shaft 144 carried in a suitable bearing 145 mounted on the spindle carrier 35. This shaft may be driven by a universal joint 146 and a drive shaft 147 and a universal joint 148 appropriately connected to drive the indexing shaft 121 as best seen in Figure 1. The drive is so arranged that with the indexing movement of the shaft 121 by the ratchet 135 the next successive step of the indexing drum 140 will be presented under the servo-valve plunger 138.

At the beginning of each machining cycle the drum will be rotated so as to each time drop the plunger 138 to the next succeeding lower step until the final bottom step 139b is reached. With the servo-valve plunger 138 on the step 139a, for instance, indexing of the drum 140 one notch will momentarily cause the servo-valve plunger to drop. This will cause pressure from the line 69k to be connected through the annular groove 149 to the line 150 which is connected to the lower chamber 151 of the cylinder 36 to thus cause the spindle carrier 35 to be raised, and this motion will continue until the next step on the drum moves the valve to its neutral position to cut off flow from the pressure line 69k to the line 150. Fluid is discharged from the chamber 152 of the cylinder 36 through the line 153, the annular groove 154 of valve plunger 138 into the drain line 84 for return of fluid to the reservoir 67. Thus, as the shaft 121 is indexed by appropriately energizing the solenoid 112 of the indexing valve 115, the servo-valve will be momentarily unbalanced until the spindle carrier 35 has moved up to the next desired indexed position, this process continuing until all the indexed spaces on the drum 140 have been passed over and the valve plunger 138 of the servo-valve finally arrives at the last step 139b.

As the last indexed position 139b is reached, a cam 155 fixed on the shaft 121 becomes effective to actuate the plunger 156 of an index return control valve. This valve connects pressure from the line 69m through the annular groove 157 of the plunger 156 to the line 158 which is connected to a pressure plunger 159 which through a suitable leverage arrangement 160 lifts the servo-valve plunger 138 upwardly, Figure 13. This reverses the connection occurring during the normal step by step indexing to now connect pressure from the line 69k through the annular groove 154 of the plunger 138 to the line 153 and chamber 152 of the cylinder 36 to rapidly move the cutter spindle carrier downwardly. Fluid is being discharged at this time from the cylinder chamber 151 through line 150 and groove 149 to the drain line 84. Thus, after the final indexing movement for the last slot, a final indexing of the shaft 121 causes the cam 155 to operate the valve plunger 156 to effect downward movement of the cutter spindle carrier 35 to its lowest position, preparatory to beginning the next cutting cycle.

The angular rotation measuring device previously referred to is provided in connection with the rotation of the work and pattern supports to automatically determine a prescribed angle of rotation of the work and pattern measured from the random point that the cutters have been fed to full working depth so that it is not necessary to have the work and pattern supports in any predetermined angular position when the cutter engages the work. This saves time and avoids the necessity for starting and stopping the work for each slot. This mechanism automatically begins functioning when the tracer has fully engaged the pattern and continues to function until an exact amount of rotation of the work and pattern spindles has been effected, in this particular case a full revolution plus small predetermined amount of angular rotation over the 360 degrees. This device operates independently of any fluctuation in the overall time required for the work to rotate through the 360 degree plus caused by the tracer varying the feed rate for different configurations of the profile of the pattern. Furthermore, this arrangement is independent of the starting point at which the cutters reach full depth of cut and tracer control is initially established.

This measuring device comprises a hydraulically operated clutching device as best shown in Figures 5, 6, 7, 8, and 9. On the base 20 of the machine is fixed a bracket 161, Figure 6, in which is journaled a bushing 162 in the bore 163 formed in the bracket 161. In a bore 164 formed in the bushing 162 is journaled the clutch spindle 165 having a flanged head portion 165a in which is formed a diametrically extending slot 166, Figure 8, in which nicely fits a tongue 167 formed on a depending shaft portion 22a of the pattern support 22 so that rotation of the pattern support positively drives the clutch spindle 165 in timed relationship with it.

Pressure supply from the line 69 through the branch line 69n, Figure 13, is connected to the timer control valve 168 having a plunger 169 actuated by the solenoid 170, so that when the solenoid 170 is energized the plunger will be moved so as to connect fluid pressure from the line 69n through the annular groove 171 to the line 172 which is connected to a port 173 formed in the bracket 161. This port communicates with an annular groove 174 formed in the periphery of the bushing 162. Radially extending passageways 175 in the bushing 162 communicate with an annular groove 176 formed in the clutch spindle 165. Thus, fluid pressure in line 172 is at all times connected to the annular grooves 174 and 176 for any rotative position of the bushing 162 and clutch spindle 165. In the groove 176 of clutch spindle 165 is formed a series of radial passageways 177 which communicate with an axial passageway 178 extending downwardly to a radial passageway 179, this latter communicating directly with a pressure pocket 180 formed in one side of the bushing 162 having faces 181, Figure 9, so that when fluid pressure enters the line 172 pressure will build up in the pressure pocket 180 to force the clutch spindle laterally and cause it to bind in the bore 164 of the bushing 162 and thus act as a clutch to connect the spindle 165 and bushing 162 for joint rotation. When fluid pressure is released from the line 172 by deenergizing solenoid 170 pressure will be released in the pressure pocket 180 and thereby disconnect clutch spindle 165 relative to the bushing 162.

In order to facilitate lateral displacement of the clutch spindle 165 when fluid pressure is applied in the pressure pocket 180 there is provided in the spindle 165 and opposite to the pressure pocket a series of drainage grooves 182 extending longitudinally of the shaft 165 and communicating with an annular drainage groove 183 formed in the periphery of the spindle 165 so that as the shaft is displaced laterally the normal lubricating film existing between the spindle 165 and the bore 164 may readily escape into the grooves 182 and then into the drain groove 183 to thus allow the spindle 165 to be forced into metal to metal contact with the bore 164. Fluid from the annular groove 183 is drained off through a series of radial passageways 184 to the annular groove 185 formed in the outer diameter of the bushing 162 which is connected to the drain line 109.

In the bracket 161 is slidably mounted a rack bar 186 on which is formed teeth 187 which operatively engage a pinion 188 formed on the lower end of the bushing 162 so that rotation of the bushing 162 will move the bar 186 axially in the bracket 161. The bar or plunger 186 is normally urged to a position 161a, Figure 5, by compression spring 189 carried in a bore 190 formed in bracket 161 and abutting against a closure bushing 191 and against the flange 192 of the plunger 186, the flange 192 in turn abutting against the end surface 193 of the bore 190 to limit the plunger in the position 161a. Plunger 186 has a stem 186a which engages a plunger 194 axially slidable in the bushing 191 and which has an adjustable abutment screw 195 adapted to engage a roller 196 of a lever arm 197 of a control limit switch 198 mounted on the base 20 of the machine by suitable screws 199.

Normally when fluid pressure is released in the line 172 by deenergizing the solenoid 170, the compression spring 189 acting against the plunger 186 holds the plunger in the position 161a and the spindle 165 is free to rotate in the bushing 162. The instant, however, that fluid pressure is applied in the line 172, the bushing 162, and therefore its integral gear 188, are connected in rotative engagement with the clutch spindle 165 and the pattern support 22. Rotation of the pattern support rotates the gear 188 and moves the plunger 186, to the left, Figure 5, by compressing the spring 189 to the position 161b, at which time the end 186a of the plunger 186 operates the limit switch 198 through the plunger 194 as described. The ratio of the gearing provided by the gear 188 and the rack 187 is so arranged as to allow the pattern support and related work supports to rotate slightly more than 360 degrees from the time fluid pressure is initially applied in the line 172 until the plunger 186 actuates the control limit switch 198. As soon, however, as pressure is released from the line 172, the plunger 186 immediately returns under the influence of the spring 189 to its original position 161a. Thus, in this way there is provided an accurate measuring device coordinated with the rotation of the pattern and work supports, such that at a given point the mechanism may be engaged to begin the movement of the rack plunger 186 and then after the work support has made a predetermined amount of rotation, in this instance slightly more than 360 degrees, a second control limit switch may be actuated. It is to be noted that the rate of rotation of the work support as it varies from one slot to another has no effect on the accuracy of the amount of angular rotation.

*Electrical control*

With the hydraulic pump 66 operating to deliver pressure to the line 69 and its associate branch lines, and with the cutter spindles 40 rotating due to the closure of switch 202, Figure 12, to complete a circuit from lead 201, switch 202, lead 203, spindle motor starters 430, latching relay 431, to the lead 204, the machine cycle may be started. The latching relay 431 closes contacts 431a through a stop button 432 in holding circuit 433.

To start the machine, the operator throws the lever 72a to start the work rotating and presses start button 205, which completes a circuit from line 201, through closed contacts 212a of an index interlock switch 212, to start relay 205a. Operation of this relay closes contacts 205b which establishes a holding circuit 434 through stop button 435 around the starting switch.

Operation of relay 205a also closes contacts 205c to complete a circuit from line 201, through closed contacts 212a, start switch 205, and line 206 to solenoid relay 110a. This effects hydraulic release of the tracer plunger so that the cross slide moves forward to engage the cutters and tracer with the work and pattern respectively along the lines 54 and 55 in Figure 10. At this time, the work and pattern supports are continuously rotating, having been started by moving the lever 72a of the start and stop switches 72b and 90b in run position as shown in Figure 12, completing a circuit from 201, switch 72b, lead 72c, solenoid 72 to lead 204 to energize solenoid 72 and thus interconnect line 87 with line 89. Line 87 is supplied at this time from pressure line 69 through the hydraulic resistance 85.

The advancing motion of the cross slide continues until the cutters have reached their full depth and the tracer disk 49 has engaged the portion 52a of the pattern to establish tracer control of the cross slide. At this point the tracer is deflected a sufficient amount to cause actuation of the limit switch 207 mounted in axial alignment with the tracer valve plunger 93. The closing of switch 207 completes a circuit through a pair of normally closed switches 95b and 217a to control relay 170a for solenoid 170. Operation of control relay 170a, closes relay contacts 170b which short circuits out switch 207 so that further deflection of the tracer will not disturb 170a.

Figures 5, 6, 7, 8, 9:
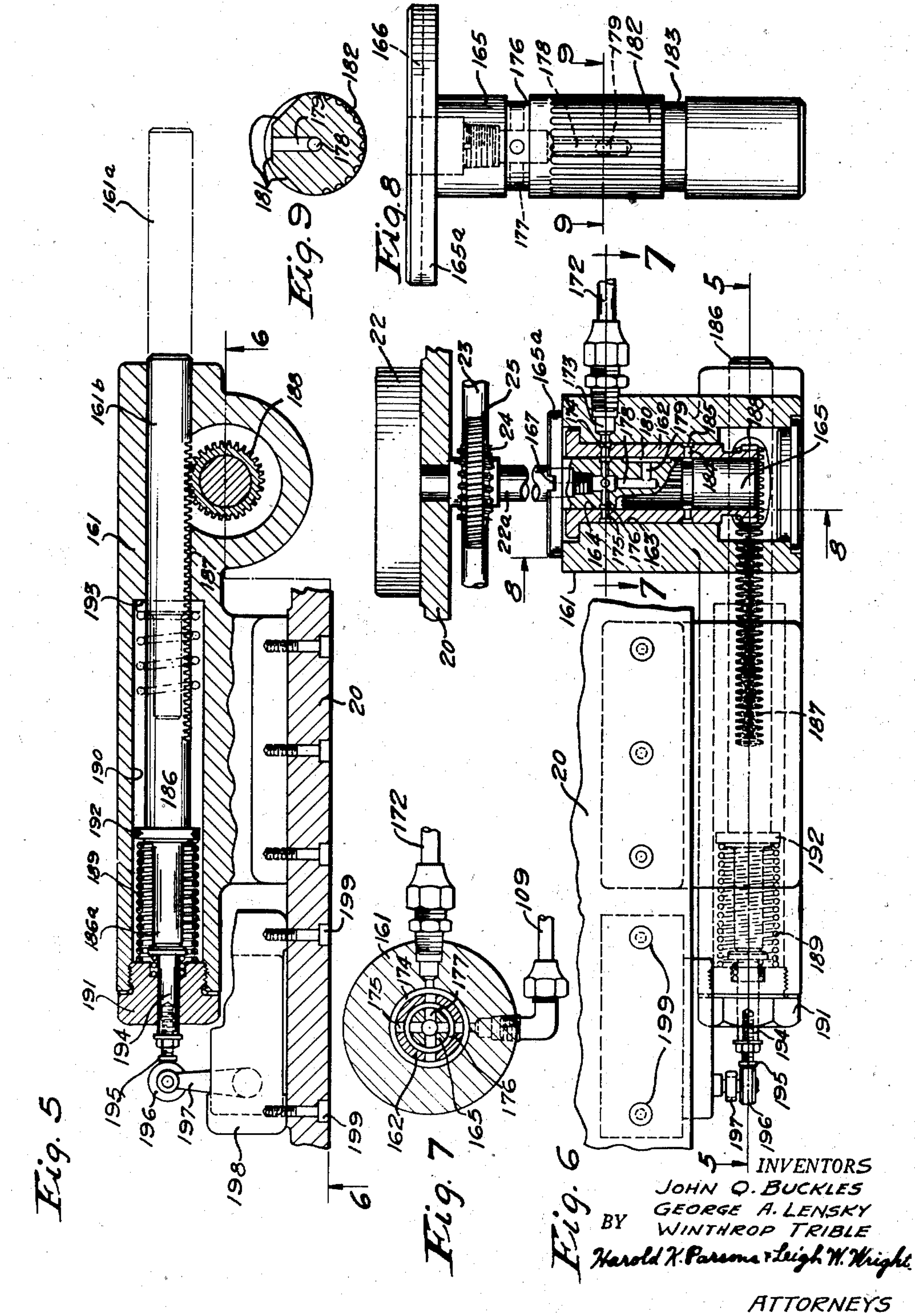
Figure 5 is an enlarged horizontal sectional view on the line 5—5 of Figure 1.
Figure 6 is an enlarged vertical sectional view on the line 6—6 of Figure 5.
Figure 7 is a sectional view on the line 7—7 of Figure 6.
Figure 8 is an enlarged view of the hydraulic clutch shaft indicated by the line 8—8 in Figure 6.
Figure 9 is a sectional view on the line 9—9 of Figure 8.

The energization of solenoid 170 effects hydraulic coupling of the clutch spindle 165 for actuation of the angular measuring device. After the work supports have completed slightly more than 360 degrees of rotation to finish machining of a slot 52, for example, as shown in Figure 10b at the point 60, the limit switch 198, Figure 5, is actuated by the plunger 186 completing a circuit from lead 201, closed contacts 170c which were closed by operation of solenoid relay 170a to relay 95a. Operation of relay 95a causes operation of solenoid 95 which effects retraction of the tracer valve and withdrawal of the cross slide 29 to the retracted position shown in Figure 10c.

It will be noted that operation of relay 95a opened normally closed contacts 95b in circuit of solenoid relay 170a whereby solenoid 170 is released to effect disengagement of the hydraulic clutch whereby the rack plunger 186 is free to return under the impetus of spring 189.

Attention is invited to the fact that when switch 207 was closed by engagement of the tracer with the pattern, it opened the normally closed pair of contacts 207a associated with the switch, thereby breaking the circuit to relay 110a. Release of this relay, permitted contacts 110b to close since these are normally closed contacts and now the operation of relay 95a closes contacts 95c, thereby establishing a holding circuit around switch contacts 170c and 198. Thus the release of solenoid 170a and resultant opening of contacts 170c does not prevent the return of the cross slide.

Figure 2:
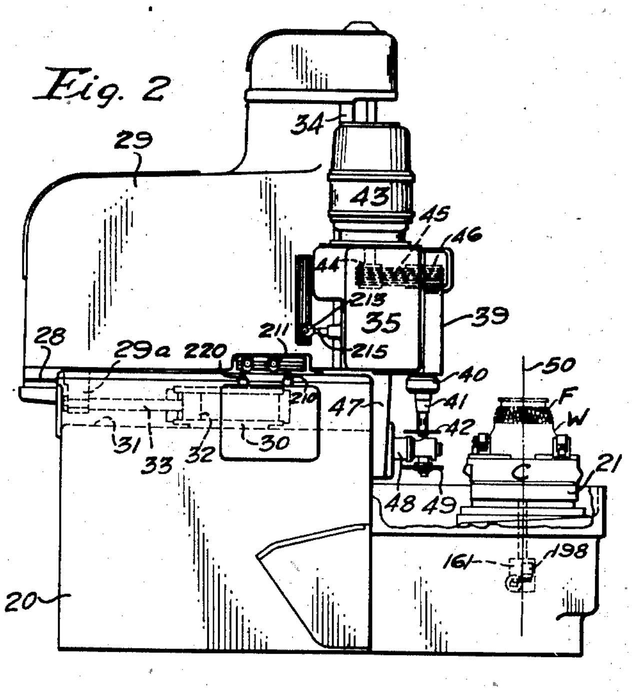
Figure 2 is a left hand end elevation of the machine shown in Figure 1.
Figure 3:
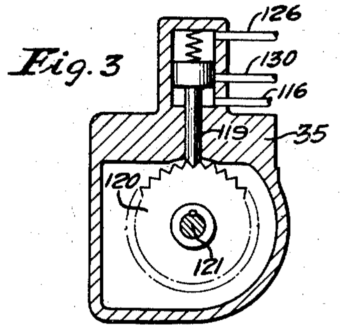
Figure 3 is a vertical sectional view on the line 3—3 of Figure 1.

As the cross slide reaches a retracted position of the cutter and tracer as shown in Figure 10c, a limit switch 210, mounted on the base 20 as shown in Figure 2 is actuated by a dog 211 to complete a circuit from the lead 201, limit switch 210, lead 211a, normally closed contacts 110c of released relay 110a, to solenoid 112 to effect upward indexing of the carrier 35 into position for cutting the next slot in the work as shown in Figure 11.

As the drum 140 indexes, the servo-valve plunger 138 and a rod 138a, which passes freely through a central bore in the plunger, both drop down due to withdrawal of the step upon which they were both resting. The dropping of rod 138a, released limit switch 212, whereby contacts 212a and 212b assume the position shown in Figure 12. Contacts 212b are free to close because they are normally closed contacts and thus cause operation of a timer relay 219. This relay closes contacts 219a in circuit with relay 110a.

When the indexing operation has been completed, the index switch 212 is again actuated closing contacts 212a and opening contacts 212b. The opening of contacts 212b releases the timer relay but this has a delayed opening actuation whereby contacts 219a remain closed for a short time.

As the cross slide continues its return movement it actuates limit switch 220 operating relay 217 which closes its contacts 217b which finally completes the circuit from line 201, through closed contacts 212a, closed contacts 219a, normally closed contacts 218a, closed contacts 217b, and closed contacts 205c to solenoid relay 110a whereby solenoid 110 operates to start a new cycle of advance of the cross slide.

This operation of solenoid 110 immediately releases switch 207 so that its contacts 207a close and establish a holding circuit to relay 110a which is maintained until the tracer engages the pattern, because as soon as the cross slide advances, the contacts 217b will open due to release of limit switch 220, and also the timer relay contacts 219a will open about this time.

The actuation of relay 217 by limit switch 220 effected by the returning cross slide momentarily opened the normally closed contacts 217a associated therewith, thus breaking the circuit to relay 170a and opening its holding circuit contacts 170b so that this circuit is now reconditioned so that upon engagement of the tracer with the pattern, the switch 207 may be closed to again cause actuation of the hydraulic clutch and measuring device.

This mode of operation continues until the last slot is cut whereupon a final indexing of the shaft 121 takes place without relative movement of the servo-valve. At this time, however, the plunger 156 of a control valve is operated by a cam 155 on the index shaft 121 to connect pressure to the line 158 to effect upward shifting of the servo-valve and downward return of the spindle carrier 35 to initial starting position.

As the spindle carrier 35 moves down to its initial starting position, a limit switch 215 carried by the spindle carrier engages a dog 213 on the cross slide and is operated to close a circuit from line 201, switch 215, line 211a and normally closed contacts 110c to solenoid 112, to effect a second indexing operation to bring the step 139a under the servo-valve plunger 138. This indexing movement of the shaft 121 causes the cam 155 to release the valve plunger 156 and thus release the servo-valve plunger which now drops down on step 139a.

Also, this final indexing movement of shaft 121 rotates the cam 214 to actuate the limit switch 216 to complete a circuit from line 201 to relay 218 which opens normally closed contacts 218a to prevent operation of solenoid 118 whereby the machine stops.

The work may now be changed, and it is necessary to manually actuate the starting button 205 to start a new cycle of operation.

There has thus been provided an improved automatic profiling machine which will profile mill a plurality of slots successively in a continuously rotating workpiece, and in spite of the fact that the cutter will engage the work at a random or unpredictable point around the periphery of the work, the machine is so contrived that such point is detected and the angular rotation of the work measured from that point so that the cutter is in engagement with the work for the same number of angular degrees for each slot cut regardless of the point of engagement with the work or the irregularity of the profile being cut.

What is claimed is:

1. In a pattern controlled machine tool, the combination with continuously rotating supporting means for a work piece and a pattern, of a cutter and tracer, means for feeding the cutter and tracer toward the work and pattern respectively to effect engagement of the tracer with the rotating pattern at some random point in the periphery thereof, a mechanism for progressively measuring the angular rotation of the work and pattern, means responsive to engagement of the tracer with the pattern at said random point to activate said mechanism, a control element actuable by said mechanism upon completion of a predetermined angle of rotation, and means responsive to actuation of said control element for effecting disengagement of the cutter and tracer from the work and pattern respectively whereby the cutter will be effective on the work for a predetermined angle of work rotation measured from said random point.

2. In a pattern controlled machine tool having work and pattern supporting means, and power operated means effecting continuous rotation of said work and pattern supporting means, the combination of a cutter and tracer, means for feeding the cutter and tracer into engagement with the rotating work and pattern respectively whereby the cutter will engage the work to a predetermined depth at some random point circumferentially thereof, means for measuring a predetermined angle of rotation of said work and pattern supporting means, means responsive to engagement of the tracer with the pattern to effect intercoupling of said measuring means with said power operated means whereby said predetermined angle will be measured from said random point of cutter engagement, said measuring means including a control operable thereby and effective on said feeding means to effect retraction of the cutter and tracer.

3. In a pattern controlled machine tool having continuously rotating work and pattern supports and a cutter and a tracer for engagement with the work and pattern respectively carried by said supports, the combination of means for feeding the cutter and tracer into engagement with the work and pattern whereby actual engagement will occur at some random point on the periphery of the work and pattern, measuring means adjustable to measure a predetermined angle of rotation of the work and pattern, means responsive to engagement of the tracer with the pattern to intercouple said measuring means for actuation in timed relation with the rotating supports whereby said predetermined angle of rotation will be measured from said random point, means responsive to completion of said measurement and effective on said feeding means to effect retraction of the cutter and tracer, means responsive to said retractive movement to effect indexing of the tracer and cutter and subsequent reengagement with the work and pattern whereby the cutter may be immediately reengaged with the work regardless of its rotary position.

4. In a pattern controlled milling machine having work and pattern supporting means, the combination with power operable means continuously rotating said supporting means, and a cutter and tracer movable into and out of engagement with the work and pattern respectively whereby the cutter and tracer will engage the work and pattern at some random point in the periphery thereof, of an angular rotation measuring means adjustable for measuring a complete revolution or other than a complete revolution of said supporting means, and means responsive to engagement of the tracer with the pattern to connect said measuring mechanism with said power operable means for actuation concurrently with said work and pattern supporting means whereby said revolution or other than said revolution of said supporting means will be measured from said random point.

5. In a pattern controlled milling machine having rotatable work and pattern supporting means, and means continuously rotating said supporting means, the combination with a cutter and tracer, of means for moving said cutter and tracer into engagement with work and pattern carried by said supporting means whereby said engagement will be effected at some random point in the periphery of the continuously rotating work and pattern, a measuring mechanism adjusted to measure more than a complete revolution of the work and pattern supporting means, means responsive to engagement of the tracer with the pattern for coupling said measuring mechanism with said rotating means whereby the angle of revolution of the work supporting means will be measured from said random point so that the cutting path of the cutter will be made to overlap regardless of the random point on the work at which the path is started.

6. In a machine tool having a rotatable work supporting means and a cutter for milling a plurality of spaced annular surfaces on the periphery of work carried by said means, the cutting path of each of which must be in overlapping relation, the combination of means for feeding the cutter to a predetermined depth into the work at some random point circumferentially thereof, means for measuring a prescribed angle of work rotation to effect said overlapping relation, electrical means for detecting the random point at which the cutter reached said predetermined depth and simultaneously effecting coupling of the measuring means with said work supporting means for concurrent progressive actuation with said work supporting means, and mechanism including control means operable by said measuring means for automatically effecting retraction, indexing and reengagement of the cutter with the work automatically for machining the next annular surface.

7. In a machine tool having a rotating work support and a cutter supported for feeding movement into the periphery of the rotating work on said support, the combination of means for continuously rotating the work support, means for detecting the random point at which the cutter reached depth in the work, a rotor continuously rotatable with the work support, means for measuring the angle of rotation of the work support from said random point, hydraulic means operable by said detecting means for coupling said measuring means with said rotor simultaneously with depth engagement of the cutter with the work.

8. In a machine tool having a rotating work support, power operable means for continuously rotating said support, and a cutter feedable to a predetermined depth into cutting engagement with the work, the combination of means for detecting the random point at which the cutter reached depth in the work circumferentially thereof, a measuring mechanism for determining the angle of rotation of the work from said random point, means operable by said detecting means for automatically coupling said measuring means to said power operable means for concomitant angular rotation with the work, said measuring means including a trip operable control device, and means responsive to actuation of said device to effect retraction of the cutter.

9. In a machine tool having a power operable rotating work support, and a cutter feedable to a predetermined depth into the work at a random point circumferentially thereof, the combination of means for determining the length of the cutting path from said random point including a control member, means for automatically coupling said member to the work support for simultaneous angular movement with the work, means for determining the time of engagement of the cutter and effecting said automatic coupling, a trip operable member in the path of said control member, means to effect relative adjustment between said members to effect variation in the timing of operation of said trip operable member, and means operable by said trip operable member to effect disengagement of the cutter from the work.

10. In a machine tool having a power operable work support and a cutter movable into engagement with the moving work at a random point thereof, means for measuring the length of the cutting path after said engagement including a movable control member, a positive stop for said member serving as a reference starting point, means normally maintaining said member in engagement with said stop, a clutching means, means determining the time of engagement of the cutter at said random point and causing engagement of said clutching means to connect said control member for concomitant movement with said work, a trip member operable by said control member, and means responsive to operation of said trip member to effect disengagement of said clutching means and retraction of the cutter whereby said control member will automatically return to its starting position.

11. In a machine tool having a power operable work support and a cutter movable into engagement at a random point with the work during travel thereof, the combination of measuring mechanism for determining the length of the cutting path subsequent to said engagement including a pair of telescoping members one of which is connected for activation with the work support, means for connecting said members for joint rotation to effect activation of said measuring mechanism including a pressure pocket formed in one side of one of said members, and means to admit pressure to said pocket to effect binding of said members together for joint rotation.

12. In a pattern controlled milling machine having work and pattern supporting means, power operable means for continuously rotating said supporting means and a cutter and tracer movable into and out of engagement with the work and pattern respectively whereby the cutter will engage some random point in the periphery of the work, an angular rotation measuring means for the work supporting means, a clutch for coupling said measuring means with said power operable means, an electrical control circuit for controlling engagement of said clutch including a control switch operable by the tracer upon engagement with the pattern, and means responsive to engagement of said clutch for nullifying said switch.

13. In a pattern controlled milling machine having work and pattern supporting means, power operable means continuously rotating said supporting means, and a cutter and tracer movable into and out of engagement with the work and pattern respectively whereby the cutter will engage a random point on the periphery of the work, the combination of an angular rotation measuring means, means operable by the tracer upon engagement with the pattern for automatically coupling said measuring means for angular rotation by the work supporting means, means operable by the measuring mechanism after a predetermined angular rotation to automatically effect retraction of the tracer and cutter and simultaneous disengagement of said coupling means, and means responsive to said retraction to effect indexing of the cutter and tracer relative to the work and pattern.

14. In a pattern controlled milling machine, a plurality of rotatable work supports and a rotatable pattern support, a hydraulic motor continuously rotating said supports in synchronism, a source of fluid pressure, means for connecting said source of fluid pressure to said motor to effect a continuous basic slow speed rotation of said supports, a cross slide, a hydraulic cross slide actuator, a metal working tool carried by the cross slide, a tracer controlled valve including a tracer engageable with a pattern for reversibly connecting fluid pressure to said actuator to control movement of the tool in accordance with the pattern, means in said tracer control valve for amplifying the supply of fluid pressure to said motor to increase the basic rate of rotation of said supports and to vary the rate of rotation in accordance with the pattern, an angular rotation measuring mechanism for said supports, means to set said mechanism for a predetermined angle, clutch means responsive to deflection of the tracer upon engagement with the pattern for coupling said mechanism for rotation with said supports and means responsive to said mechanism upon completion of said angle of rotation to connect fluid pressure to said cross slide actuator.

15. In a pattern controlled milling machine having rotatable work and pattern supports, a feed drive motor synchronously rotating said supports, a fluid pressure pump connectable to said feed motor to effect a continuous basic rate of rotation of said supports, a cross slide movable to and from said supports, a hydraulic actuator connected to said cross slide, a tracer control valve including a tracer adapted to reversibly connect fluid pressure to said cross slide, means in said tracer control valve rendered operative upon engagement of the tracer with the pattern to increase and vary the basic rate of said feed motor, an angular rotation measuring device, means operated by the initial engagement of the tracer with the pattern to couple said device for rotation with said supports, said device being set for a predetermined angle of rotation, and means responsive to completion of said angle of rotation to connect fluid pressure to effect withdrawal of the cross slide and further mechanism subsequently operated by said device to cause withdrawal of said cross slide.

16. In a pattern controlled milling machine, a frame, a rotatable work table and a rotatable pattern table journaled on said frame, means continuously rotating said tables in timed relationship, a cutter and tracer carrier, means controlled by a tracer on said carrier to cause relative movement between said carrier and tables to effect engagement of the tracer with a pattern on said pattern table, an angular rotation measuring mechanism for said tables comprising a sleeve journaled in said frame, a clutch operable in response to engagement of the tracer with the pattern to interconnect said rotating means with said sleeve, a pinion formed on said sleeve cooperating with a rack mounted for sliding movement in said frame, and a control device, operable by the movement of said rack to a predetermined position upon rotation of said pinion to cause withdrawal of said cutter and tracer carrier from said spindles.

17. In a pattern controlled milling machine having a rotatable work and pattern table, a cutter and tracer carrier movable radially to and from said spindles, a measuring device for determining the angle of rotation of said tables from the point of initial engagement of the tracer with the pattern comprising a mechanical operator, means for effecting connection of said operator to one of said tables for movement therewith, and control means operated by said operator after a predetermined movement defining a predetermined amount of angular rotation to automatically cause withdrawal of said cutter and tracer carrier from said table.

18. In a pattern controlled milling machine having a continuously rotating pattern support, the combination therewith of a slide carrying a deflectable tracer, said slide being guided for advance and retractive movements with respect to said pattern supporting means, said tracer being movable between spaced operative positions, the first of which causes advance and the second causes retraction of said slide, control means for positioning the tracer in said first position to connect a source of power for causing advance of the cross slide and engagement of the tracer with the pattern, and means for measuring the extent that the tracer will scan the pattern after engagement therewith including an angular rotation measuring device, means responsive to movement of the tracer upon engagement with the pattern to effect interconnection of said device for joint rotation with the pattern support, means to set a limit on the angle of rotation of said device, and means responsive to said device upon reaching the limit of its rotation to effect positioning of the tracer in its second position to cause disengagement of the tracer with the pattern.

JOHN Q. BUCKLES.
GEORGE A. LENSKY.
WINTHROP TRIBLE.

REFERENCES CITED

The following references are of record in the file of this patent:

UNITED STATES PATENTS

| Number | Name | Date |
|---|---|---|
| 1,667,153 | Heymann | Apr. 24, 1928 |
| 1,739,390 | Caton | Dec. 10, 1929 |
| 2,130,627 | Kelly | Sept. 20, 1938 |
| 2,401,803 | Turchan | June 11, 1946 |
| 2,420,547 | Lovely | May 13, 1947 |
| 2,450,096 | Siekmann | Sept. 28, 1948 |